(12) United States Patent
Guichaoua et al.

(10) Patent No.: US 6,540,913 B1
(45) Date of Patent: Apr. 1, 2003

(54) FILTER APPARATUS HAVING A MAINTAINING DEVICE FOR CENTERING A STACK OF FILTRATION DISKS

(75) Inventors: Jean-Luc Guichaoua, Combrit (FR); Gérard Malgorn, Quimper (FR); Benoît Le Roux, Fouesnant (FR)

(73) Assignee: Fleetguard, Inc., Nashville, TN (US)

( * ) Notice: Subject to any disclaimer, the term of this patent is extended or adjusted under 35 U.S.C. 154(b) by 0 days.

(21) Appl. No.: 09/631,930

(22) Filed: Aug. 3, 2000

(30) Foreign Application Priority Data

Aug. 3, 1999 (FR) .............................. 99/10212

(51) Int. Cl.$^7$ .......................... B01D 25/00; B01D 27/08
(52) U.S. Cl. ................. 210/232; 210/346; 210/435; 210/437; 210/439; 210/451; 210/455; 210/462; 210/486; 210/489; 210/329; 210/331
(58) Field of Search ................. 210/435, 455, 210/459, 461–462, 483, 486, 488, 346, 330–331, 350, 357, 437–438, 457, 232, 489, 338, 329, 316, 440, DIG. 13, 314

(56) References Cited

U.S. PATENT DOCUMENTS

| 407,112 | A | * | 7/1889 | Parmenter et al |  |
| 730,485 | A | * | 6/1903 | Simoneton . |  |
| 2,365,525 | A | * | 12/1944 | Cox |  |
| 2,575,995 | A | * | 11/1951 | Briggs et al. |  |
| 3,592,766 | A | * | 7/1971 | Kudlaty |  |
| 4,435,287 | A | * | 3/1984 | Sumimoto | 210/131 |
| 4,642,182 | A | * | 2/1987 | Drori | 210/232 |
| 5,102,541 | A | * | 4/1992 | Breitbach | 210/232 |
| 5,665,231 | A | * | 9/1997 | Langsdorf et al. | 210/314 |
| 6,293,410 | B1 | * | 9/2001 | Forbes | 210/446 |

* cited by examiner

Primary Examiner—Matthew O. Savage
Assistant Examiner—Marianne Ocampo
(74) Attorney, Agent, or Firm—Gary M. Gron

(57) ABSTRACT

A maintaining device for a filter medium having a stack of filtration disks presenting a central aperture, characterized in that it comprises a first flange with at least one central opening, a second flange and at least one perforated first central element intended to operate together with said central aperture of said stack of filtration disks, said first central element being integral at one its extremities with said second flange and being provided at its other extremity with ratchets intended to operate together with said central opening of said first flange.

9 Claims, 3 Drawing Sheets

FILTER APPARATUS HAVING A MAINTAINING DEVICE FOR CENTERING A STACK OF FILTRATION DISKS

The invention relates to filter assemblies used to filter liquids circulating in internal combustion engines or hydraulic equipment.

BACKGROUND OF THE INVENTION

The above filter assemblies are made up of a filter body within which a filter cartridge is set, generally with a cylindrical shape and which includes a filtration medium which can for example be made of paper, cardboard or felt or other material. This medium is limited by two end flanges.

The present trend is to produce such filter cartridges in materials which can be incinerated. In particular, as far as the flanges are concerned, the present trend is to produce the flanges in plastic material.

It is to be noted that in many cases, it is preferable to envisage two circuits for the liquid to be filtered, that is a main circuit and a branch circuit making it possible to remove both larger and smaller particulates during filtering of the liquid passing through in the main circuit. However, in such a case, generally only one filter cartridge is used, the latter then being constituted of two essential parts integrating two filtration media, one for treating the liquid in the main circuit and the other for filtering the liquid in the branch circuit. The filter medium used for filtering the liquid in the branch circuit is, in the present state of the art, constituted by a stack of paper or cardboard disks showing a central aperture and able to be of circular, hexagonal, octagonal or other shape. (The term "disk stack" used in the present patent application is aimed at covering any laminate structure constituted by superposition of several layers of filter medium in paper, cardboard or any other equivalent material, for example synthetic or inorganic fibers, able to take any geometric shape). The disks constituting the stack in question include one or several holes and form a column showing a central aperture.

A problem encountered with this type of filter medium comes from the fact that the height of the stack diminishes little by little with time. In fact, in order to avoid a radial passage of the fluid to be filtered in such a stack, which would lower the quality of filtration, it is necessary to compress said stack in such a way as to ensure permanent and good cohesion of the disks constituting it. To this end, filter assemblies using such a cartridge with a double filter medium are generally provided with a spring set between the cover and said cartridge, making it possible to press the latter onto the base of the chamber and to compress the disk stack.

As a complement to the use of such a spring, it has also been envisaged to provide external arms around this stack operating together with a lower flange, said arms being provided with ratchets which engage the flange and allow the cohesion of the disks to be maintained when the height of the stack diminishes under the effect of pressure. Such a technique is described in U.S. Pat. No. 5,665,231.

Such prior art, however, presents many inconveniences. In the first place, it can be noted that the device described is relatively complex to produce. Moreover, in certain cases, it does not prevent the disks constituting the stack to turn on themselves, which contributes to deterioration of the quality of filtration. Finally, it still requires the use of a compression spring which raises the cost of fabrication of the filter assembly and complicates changing the cartridge.

SUMMARY OF THE INVENTION

The principal objective of the present invention is to propose a device for maintaining a disk stack used in a branch filter which does not have the inconveniences of the present state of the art.

A particular objective of the present invention is to propose such a maintaining device which can make it possible to be free from using a compression spring for the cartridge in the chamber.

A further objective of the present invention is to propose a cartridge equipped with such a branch device which can be integrated easily on a cartridge with a double filter medium.

Another objective of the present invention is to propose a cartridge equipped with such a maintaining device allowing it to be removed cleanly from the chamber of the filter assembly.

A further objective of the present invention is to propose such a maintaining device which also makes it possible to centre the disks constituting the stack and to index them.

These different objectives are attained pursuant to the present invention by a maintaining device for a filter medium comprising a stack of filtration disks with a central aperture characterised in that the maintenence device includes a first flange presenting at least one central aperture, a second flange, and at least one first central element which is perforated and intended to operate together with said central aperture of said stack of filtration disks, said first central element being integral at one of its ends with said second flange and being provided at its other end with ratchets intended to operate together with said central opening of said first flange.

In relation to the present state of the art, the present invention proposes envisaging a ratchet mechanism which is not external to the disk stack but inside it. Such a characteristic makes it possible to ensure higher sturdiness for the maintaining device and does not hinder filtration.

It is to be noted that to allow the passage of filtered fluid from the outside of the stack to its central aperture the central element must necessarily be perforated. It is evidently possible to envisage different architectures to allow the passage of this fluid into the central aperture.

According to a preferred variant, this first central element has a first part with an essentially solid cross-section and a second part constituted of a plurality of lugs provided with ratchets. One could envisage a number of lugs provided with ratchets and a shape for the first part which could vary according to the shape of the central aperture of the disk stack. In fact, according to the modes of embodiment, this central aperture could present a variable shape (circular, oblong, hexagonal, octagonal etc.).

Preferably, said first flange has as many central openings as said first central element has lugs provided with ratchets, each lug operating together with one of said central openings.

According to one interesting embodiment of the invention, the second part of the first central element can be constituted of four lugs provided with ratchets. Also according to an interesting embodiment of the invention, the first part of this central element will present a non-circular cross-section in such a way as to operate together with a disk stack whose central aperture is not circular. In this way, it will be possible to index the centring easily for the disk stack around the central element.

Again, according to a preferred variant, the central element is formed as a single block with the second flange.

Such a characteristic allows the fabrication costs of the maintaining device according to the invention to be reduced.

According to the invention described above, the maintaining device can thus be constituted of two flanges, and a central ratchet element. During the use of such a device, the stacking of disks will be piled on the central element and blocked between the two flanges, making this central element operate together with the openings of the first flange. During the creep of the filter medium resulting in a reduction of the height of the disk stack, the second flange comes closer to the first flange under the effect of the pressure of fluid to be filtered and/or possibly a spring positioned in the filter assembly to hold down the cartridge in the chamber; the closing of the second flange towards the first flange is due to the operation of the ratchets together with the openings of this first flange.

According to a preferred embodiment of the invention, the maintaining device according to this is not made up of two flanges, that is a fixed flange and a mobile flange, but three flanges, that is a first fixed flange then a second intermediary mobile flange and then a third fixed flange. In this case, the first central element is preferably hollow and the device will comprise a third flange and a second central element integral at one of its ends with said first flange and at the other of its ends with said third flange, said second central element having a cross-section smaller than said first central element and sliding inside it.

In this case, a joint will be set between the first central element and said second element to stop any leak of the filtered fluid.

According to a preferred embodiment, the second central element will be formed in a single block with the third flange.

The ratchets described above arranged around the first central element will moreover be advantageously placed at a height "h" corresponding to about 10 to 20% of the initial height "H" of the stack of filtration disks.

The invention also relates to any filter cartridge characterised in that it presents a filter medium constituted by a stack of filtration disks with a central aperture and a maintaining device as described above, said first central element of this extending into said central aperture of said stack.

Preferably, such a cartridge integrates a second filter medium defined by an upper flange and a lower flange, said upper flange being constituted by said first flange of said maintaining device.

Finally, the invention also relates to a filter assembly comprising a filter body constituted of a chamber and a cover, and a cartridge such as that described above, said cartridge designed to be disposable after use, characterised in that said cover has an internal peripheral edge designed to operate together with a flange of said cartridge in such a way as to extract said cartridge when the chamber cover is removed.

Preferably, said filter assembly does not include any spring to hold the cartridge down in the chamber and compress the disk stack.

BRIEF DESCRIPTION OF THE DRAWINGS

The invention, as well as the different advantages it presents, will be understood more easily thanks to the following description of a preferred embodiment, given in reference to the figures, in which.

DETAILED DESCRIPTION OF THE PREFERRED EMBODIMENT

Figure 1:
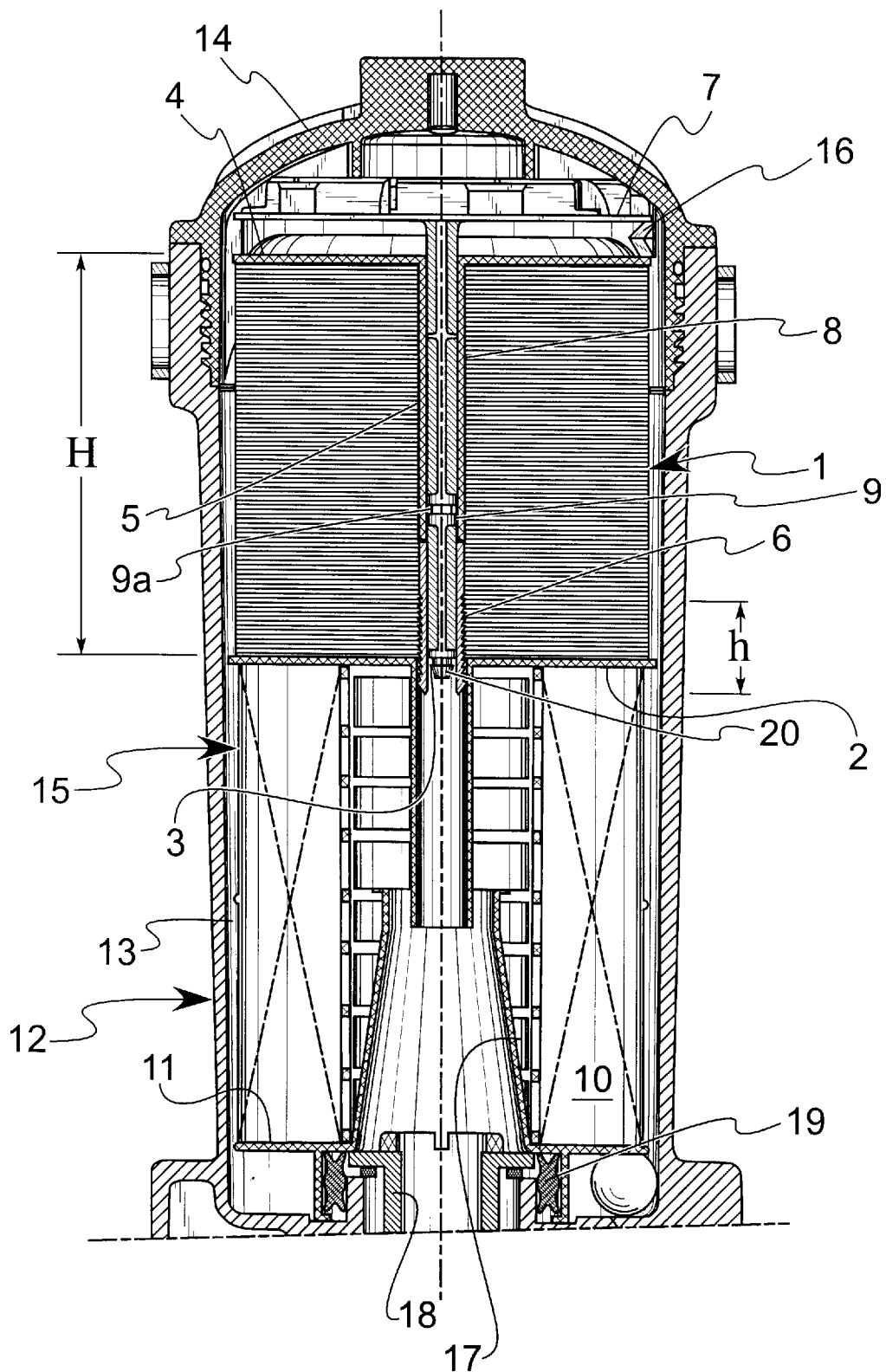
FIG. 1 represents a cross section of a filter assembly integrating a filter cartridge provided with a maintaining device for a stack of filtration disks according to the present invention.

Referring to FIG. 1, a filter assembly for a liquid coming from a engine is represented in longitudinal cross-section. This filter assembly comprises a filter body 12 having an internal chamber 13 on which an amnular cover 14 is screwed. The filter body 12 houses a cartridge 15 integrating two filtration media and allowing filtering of a main circuit of liquid to be filtered and the filtering of its branch circuit. More precisely, the cartridge 15 comprises two parts: an upper part integrating a stack 1 of filtration disks in cardboard, said stack 1 presenting an initial height "H", said stack 1 being maintained by a maintaining device according to the present invention which will be described below in more detail; and a lower part presenting a filter medium 10 constituted of accordion folded paper arranged around the central perforated tube 17 in plastic material and defined by a lower flange 11 also in plastic material. Such a cartridge is made from materials which can be incinerated. The cartridge 15 is held in the chamber 13 over an outlet aperture 18 of the filtered liquid. A seal with four lobes 19 is used to ensure the seal between the non-filtered liquid and the outlet aperture 18.

In accordance with the present invention, the maintaining device of the disk stack 1 comprises a first flange 2 provided with at least one aperture 3 (see also FIG. 4), a second flange 4 integral with a first central perforated tubular element 5 whose end is provided with ratchets 6 operating together with the aperture 3 of the first flange 2. The maintaining device of the disk stack 1 also has a third flange 7 prolonged by a second central element 8 formed in a single block with it, whose end is integral with the first flange 2 by adequate means 20.

It is to be noted that this third flange 7 is designed to operate together with an internal peripheral lip 16 formed in the cover 14 of the filter assembly represented. In this way, when the cover 14 is unscrewed and the chamber 13 exposed, this removal brings with it the cartridge 15, which means it can be withdrawn cleanly, that is to say without touching it directly. The cartridge can then be separated easily from the cover and incinerated.

Figure 2:
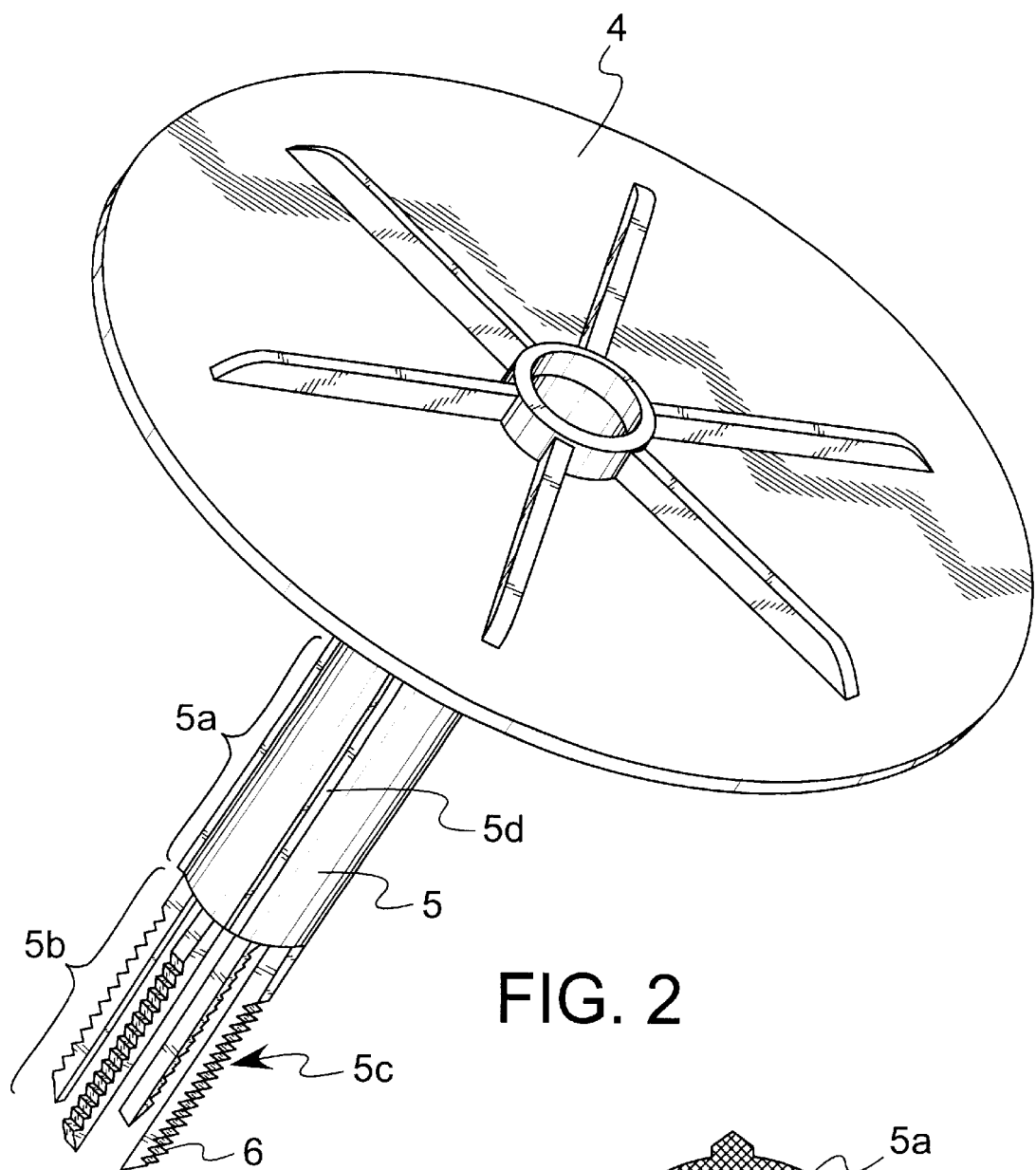
FIG. 2 represents a perspective view of the assembly constituted by the second flange and the first central element of the maintaining device shown on the cartridge represented in FIG. 1.
Figure 3:
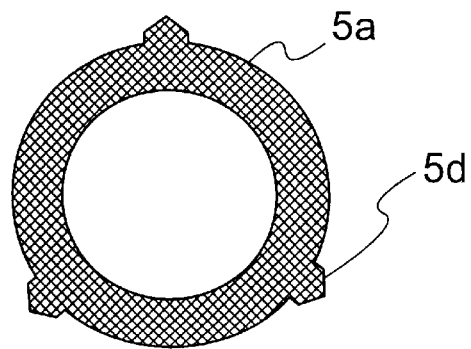
FIG. 3 represents a transversal cross-section of the first central element.

As can be seen more precisely in FIG. 2, the first central element 5 provided with ratchets 6 extending from the second flange 4 has two parts, that is: a first part 5a of the solid cross-section with a non-circular cross-section provided with ribs 5d (also visible on FIG. 3) making it possible to center the disk stack 1 and to index this centering; a second part 5b constituted of four lugs 5c provided with ratchets 6.

Figure 4:
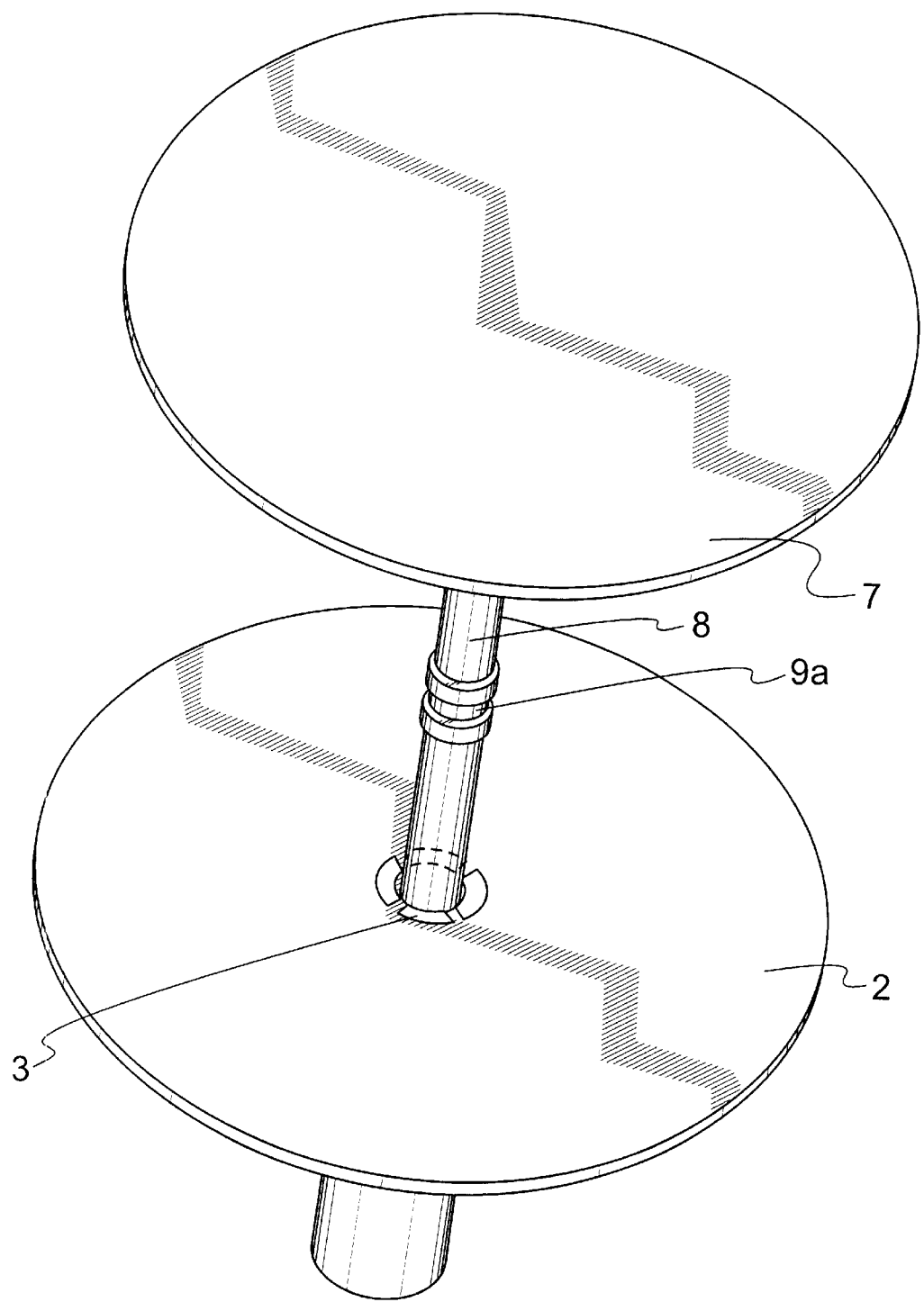
FIG. 4 represents a perspective view of the first and second flanges as well as the second central element of the maintaining device integrated into the filtration cartridge represented in FIG. 1.

FIG. 4, shows the third flange 7 and the second central elongated element 8 provided with a groove 9a making it possible to position a joint 9 (see FIG. 1). The integral assembly formed by the third flange 7 and the central element 8 is shown along with the first flange 2 to which it is fixed and which constitutes the upper flange defining the second filter medium 10 dedicated to filtering the main circuit of the liquid to be filtered.

As shown in FIG. 4, there are four apertures 3 found in first flange 2 to receive the four lugs 5c when the assembly of FIG. 4 is combined with the assembly represented in FIG. 2 in the position shown in FIG. 1 wherein the second central element 8 is received in the first central element 5.

During the operation of the filter assembly, the height "H" of the disk stack 1 diminishes little by little. Under the effect of the pressure of the liquid to be filtered, the assembly constituted by the relatively moveable second flange 4 and the first central element 5 displaces into the first flange 2, the ratchets 6 preventing further distancing of second flange 4 from the first flange 2. It is to be noted that the ratchets 6 are arranged over a height "h" representing about, 15% of the initial height "H" of the stack 1 of filtration disks.

In this way, the maintaining device can ensure the compression of this stack during the whole of the lifetime of the cartridge 15.

When the third flange 7 is lifted by maneuvering the cover, the first flange 2 fixed to it is lifted and thus the cartridge as a whole, at whatever the compression of the disk stack 1 and the position of the mobile second flange 4.

It is also to be noted that thanks to the architecture of the maintaining device shown in FIG. 1, it is no longer necessary to use a spring between the cover and the cartridge in order to hold the latter down on the base of the chamber, which represents a major advantage compared with prior art.

Having this described the invention,

What is claimed as novel and desired to be secured by Letters Patent of the United States is:

1. Apparatus for a filter medium, comprising a stack of filtration disks with a central aperture, characterized in that said apparatus comprises a first flange on one side of said stack and having a plurality of central openings, a second flange and at least one perforated elongated first central element extending through the central aperture of said stack of filtration disks, said first central element being integral at one of its ends with the second flange and having a first part of essentially solid cross-section and a second part at its other end with a plurality of lugs with superposed rachets intended to operate together with said plurality of said central openings, each lug cooperating together with one of said central openings.

2. Apparatus according claim 1 wherein said first central element is hollow.

3. Apparatus according to claim 2, further comprising a third flange and a second central element being fixed at one of its ends to said first flange and at the other of its ends being fixed to said third flange, said second central element having a smaller cross-section than said first central element and sliding inside said first central element.

4. Apparatus according to claim 3 further comprising at least one joint set between said first central element and said second central element.

5. Apparatus according to claim 4 wherein said second central element is formed integrally with said third flange.

6. Apparatus according to claim 5, wherein said ratchets are spread around said first central element at a height "h" equal to about 10% to 20% of an initial height "H" of said stack of said filtration disks.

7. Apparatus according to claim 6 further comprising a second filter medium limited by an upper flange and a lower flange, said upper flange comprising said first flange.

8. Apparatus according to claim 1, wherein said plurality of lugs includes four lugs provided with ratchets.

9. Apparatus according to claim 8 wherein said first part of said first central element presents a non-circular cross-section.

\* \* \* \* \*